UNITED STATES PATENT OFFICE.

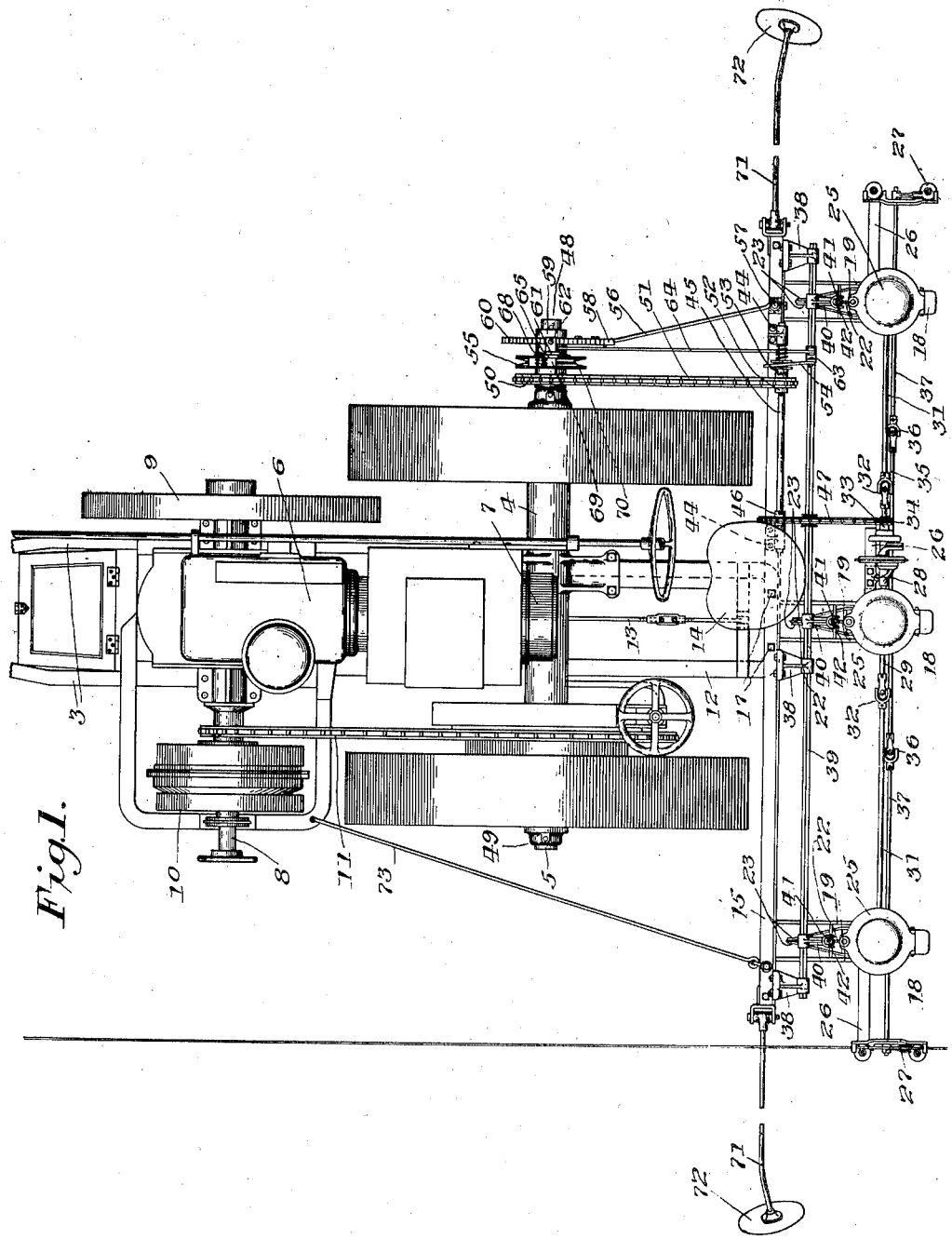

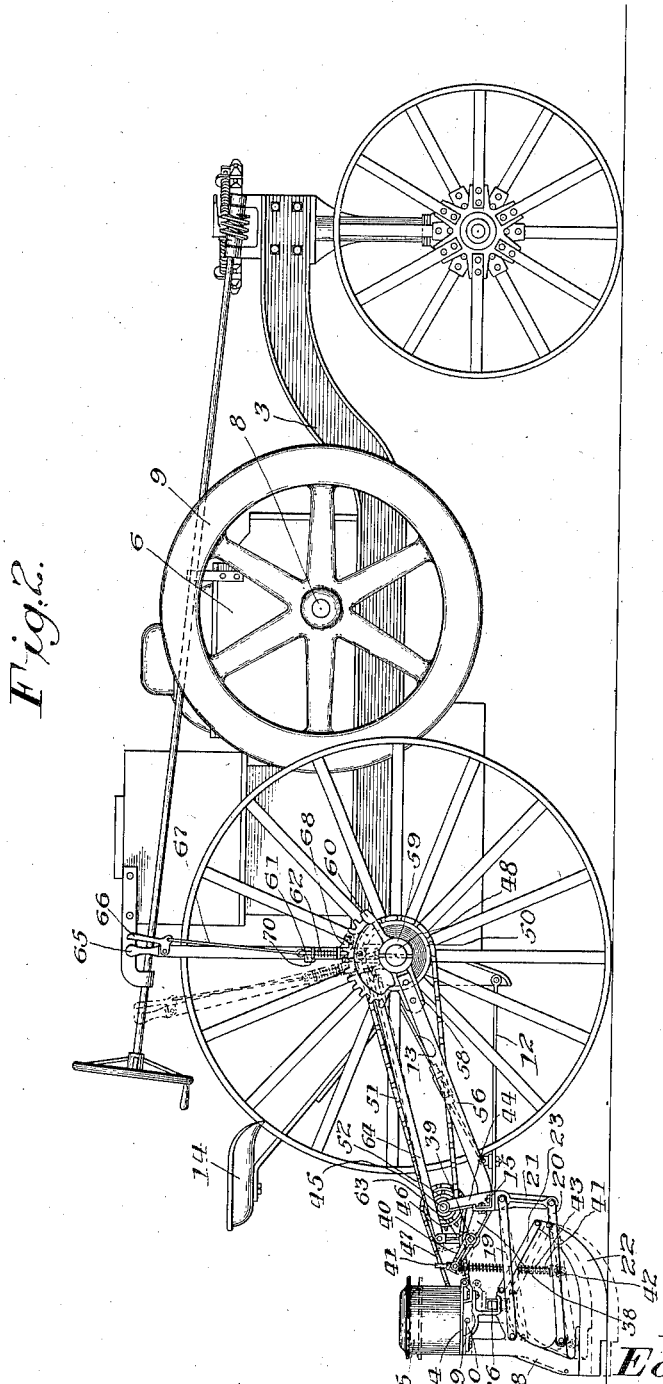

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

CORN-PLANTER.

1,308,163.      Specification of Letters Patent.      Patented July 1, 1919.

Application filed August 26, 1916. Serial No. 116,948.

*To all whom it may concern:*

Be it known that I, EDWARD W. BURGESS, a citizen of the United States, residing at Chicago, in the county of Cook and State of Illinois, have invented certain new and useful Improvements in Corn-Planters, of which the following is a full, clear, and exact specification.

My invention relates to corn planters, and in particular to a machine of the class indicated adapted to be connected with a tractor and have its operative parts driven by a power transmitting element thereof; the object of my invention being to provide a light and efficient machine controllable by the operator from the seat of the tractor. This object is attained by means of the mechanism illustrated in the accompanying drawings, in which—

Figure 1 is a top plan view of a tractor having a corn planter connected therewith and embodying my invention; and Fig. 2 is a side elevation of Fig. 1.

The same reference characters designate like parts throughout the several views.

The tractor includes truck frame members 3 having secured to their rear ends a tubular frame member 4, in which is journaled an axle 5, 6 an engine carried by the truck frame and including a power cylinder 7, an engine shaft 8, a fly wheel 9, and a power transmission gear 10 operatively connected with the axle 5 by means including a sprocket chain 11, 12 a draft frame connected with the tubular frame member 4 and supported by a longitudinally adjustable link 13 connecting its rear end with a fixed part of the tractor, and 14 an operator's seat carried by the tubular frame member 4.

The planter includes a transversely disposed frame member 15 secured to the rear end of the draft frame 12 by means of bolts 17. 18 represents hollow planter boots that are connected to the rear ends of upper and lower pairs of spaced parallel drag bars 19 and 20, respectively, having their front ends pivotally connected with bracket members 21 adjustably secured to the frame member 15, whereby the boots are maintained in a vertical position as they are raised or lowered. Secured to the lower ends of the boots are furrow opening runners 22, having their front upturned ends connected with the upper ends of the boots by means of brace members 23. Secured to the upper ends of the boots are gear carrying plates 24, with which are hingedly connected seed containers 25.

The planter includes three seed dropping units, and each boot is provided with a laterally extending bar 26, the bar upon the outside boots carrying the check wire heads 27 and the one upon the middle boot a bearing bracket 28, in which is journaled one end of a feed shaft 29 that is journaled in a second bearing 30 carried by the gear plate 24. 31 represents extensions of the feed shaft 29 having their outer ends journaled in bearings carried by the gear plates 24 upon the outside boots and having their inner ends connected with opposite ends of the feed shaft 29 by means of universal coupling members 32.

A variable clutch mechanism includes a constantly rotatable element 33 journaled upon the feed shaft 29 and including a sprocket wheel 34. 35 represents a clutch tripping and valve operating shaft journaled in bearings carried by the gear plate 24 and bar 26 upon the middle boot and provided with universal coupling members 36 upon its opposite ends whereby it is operatively connected with the inner ends of trip shaft extensions 37 journaled in bearings carried by the gear plates upon the outside boots and the check wire heads 27. 38 represents bearing brackets secured to the frame member 15, in which is journaled a rock shaft 39 having rearwardly extending pressure arms 40 secured thereto, having their rear ends slidably connected with the upper ends of links 41, having their lower ends pivotally connected with spacing bars 42, having their opposite ends connected with the lower pairs of drag bars 20 of each boot, and reacting between the spacing bars and the pressure arms are pressure springs 43 encircling the links. Journaled in bearing members 44 secured to the frame member 15 is a countershaft 45, having secured thereto a sprocket wheel 46 operatively connected with a sprocket wheel 34 by means of a sprocket chain 47.

The tractor axle 5 is provided with right and left-hand extensions 48 and 49, respectively, at its opposite ends, and secured to said extension 48 is a sprocket wheel 50 that is operatively connected by means of a chain 51 with a sprocket wheel 52 journaled upon the countershaft 45 and normally connected therewith by means including a spring-pressed clutch sleeve 53 splined upon the countershaft and controlled by a cam arm 54 secured to the rock shaft 39 whereby, when the shaft 39 is rocked in a direction to lift the furrow opening runners from the ground, the sleeve 53 is disengaged from the sprocket wheel 52. Mounted upon the axle extension 48, and rotatable with the sprocket wheel 50, is a friction sheave 55. 56 represents a draft bar having its rear end pivotally connected at 57 with the frame member 15 and having secured to its front end a draft bracket 58 provided with a sleeve 59 that receives the axle extensions and a toothed sector 60 concentric with the axis of the sleeve. Turnable upon the sleeve 59, adjacent the sheave 55, is an arm 61 carrying a spring-pressed slidable detent 62 normally engaging with the toothed sector 60. Secured to the rock shaft 39 is a vertically disposed arm 63, and 64 represents a bar connecting it with the arm 61. 65 represents a hand operable lever pivotally connected at its lower end with the arm 61 and carrying at its upper end a thumb lever 66 that is connected by means of a link 67 with the detent 62. The lower end of the lever 65 is provided with a forwardly extending arm 68, upon which is pivotally mounted a brake shoe 69 adapted to engage with the friction sheave 55. The hand lever may be turned forward about its pivotal connection with the arm 61 and cause the brake shoe to engage with the sheave, and then the arm turns with the sheave. When the hand lever is turned rearward it engages a lip member 70 upon the arm whereby the arm is moved with the lever.

71 represents marker arms pivotally connected with opposite ends of the frame member 15 and carrying rotatable markers 72 upon their outside ends. 73 represents a draft member connecting the end of the frame member 15 with the framework of the tractor.

In operation the furrow opening runners are drawn forward by the frame member 15 and are free to rise and fall independently, carrying with them the boots and seed containers, the parallel drag bars 19 and 20 maintaining the boots in vertical position and the flexible connections between the boots and clutch tripping shafts permitting an independent rising and falling movement of the seed dropping and planting units. The operative depth of the furrow opening runners is controllable by the operator by means of the hand lever 65 from the seat of the tractor. Forward movement of the lever will cause the arm 61 to raise a furrow opener from the ground.

Having shown and described one embodiment of my invention, I do not desire that it be confined to the specific details of the structure as illustrated, it being understood that changes may be made in the form, proportion and organization of its several parts without departing from the spirit of the invention as indicated in the appended claims.

What I claim as my invention and desire to secure by Letters Patent is:

1. In a planter, a transversely disposed frame member, a rock shaft carried thereby, pressure arms secured to said rock shaft, rising and falling drag bars having one end thereof pivotally connected with said frame member, furrow openers, seed containers and seed dropping elements carried by the opposite ends of said drag bars, and spring pressure mechanism connecting said drag bars to the rear ends of said pressure arms.

2. In a planter, a transversely disposed frame member, a rock shaft carried thereby, a driving shaft, pressure arms secured to said rock shaft, rising and falling drag bars having one end thereof pivotally connected with said frame member, furrow openers, seed containers and seed dropping elements carried by the opposite ends of said drag bars, spring pressure mechanism connecting the drag bars to the rear ends of said pressure arms, and manually controllable mechanism for transmitting power from said drive shaft to said rock shaft.

3. In a planter, a transversely disposed frame member, a planter boot, a furrow opener connected with said boot, parallel drag bars pivotally connecting said boot with said frame member to operatively maintain said boot in the same operative position when it is raised and lowered, a rock shaft, pressure arms secured thereto, and spring pressure mechanism connecting said pressure arms with certain of said drag bars.

In testimony whereof I affix my signature.

EDWARD W. BURGESS.